United States Patent [19]
Giebel et al.

[11] Patent Number: 5,863,083
[45] Date of Patent: Jan. 26, 1999

[54] PULLING GRIP FOR PRE-CONNECTORIZED FIBER OPTIC CABLE

[75] Inventors: Markus A. Giebel, Hickory; Michael J. Ott, Taylorsville, both of N.C.

[73] Assignee: Siecor Corporation, Hickory, N.C.

[21] Appl. No.: 752,116

[22] Filed: Nov. 20, 1996

[51] Int. Cl.⁶ .............................. G02B 6/36; H02G 1/08
[52] U.S. Cl. .................................. 294/1.1; 254/134.3 FT; 294/86.42; 385/136
[58] Field of Search .................... 294/1.1, 86.42, 294/90, 91; 24/115 R, 115 A, 115 N, 122.3, 122.6; 174/75 C, 79; 254/134.3 R, 134.3 FT; 385/136; 403/220, 223, 275, 291, 373

[56] References Cited

U.S. PATENT DOCUMENTS

| | | | |
|---|---|---|---|
| 3,940,732 | 2/1976 | Hudson et al. | 174/79 X |
| 4,368,910 | 1/1983 | Fidrych . | |
| 4,602,763 | 7/1986 | Gaylin | 254/134.3 FT |
| 4,684,211 | 8/1987 | Weber et al. | 385/136 |
| 5,117,479 | 5/1992 | Erdman et al. | 385/136 |
| 5,129,027 | 7/1992 | Boero et al. | 254/134.3 FT |
| 5,133,583 | 7/1992 | Wagman et al. . | |

FOREIGN PATENT DOCUMENTS

| | | | |
|---|---|---|---|
| 134605 | 6/1987 | Japan | 385/136 |
| 153801 | 7/1987 | Japan | 385/136 |
| 206708 | 8/1988 | Japan | 385/136 |
| 08292331A | 11/1996 | Japan | G02B 6/00 |
| 10606 | 1/1997 | Japan | 385/136 |
| 09197226A | 7/1997 | Japan | G02B 6/46 |
| 341186 | 11/1959 | Switzerland | 24/115 N |

*Primary Examiner*—Johnny D. Cherry

[57] ABSTRACT

The pulling grip includes an elongated, flexible pulling grip housing for use in installing fiber optic cable and, more particularly, for installing a fiber optic cable which contains a number of pre-connectorized optical fibers. The pulling grip housing includes first and second portions which mate to form the pulling grip housing and which open to provide access to an internal cavity for placement of the pre-connectorized optical fibers of the fiber optic cable. The pulling grip housing can secure the connectors within the internal cavity to prevent undesirable tangling of the optical fibers during installation. For example, the pulling grip housing can include an adhesive surface or a number of slots for retaining respective ones of the connectors. The pulling grip is also connected to an end portion of the fiber optic cable and, more particularly, a strength element of the fiber optic cable such that forces imparted during the advancement of the pulling grip housing through a conduit are transferred to the strength element of the fiber optic cable and do not place undesirable strain on the optical fibers. The pulling grip housing therefore protects the optical fibers and the respective connectors from damage during installation while permitting pre-connectorized fiber optic cables to be installed regardless of the leg lengths of the optical fibers.

34 Claims, 3 Drawing Sheets

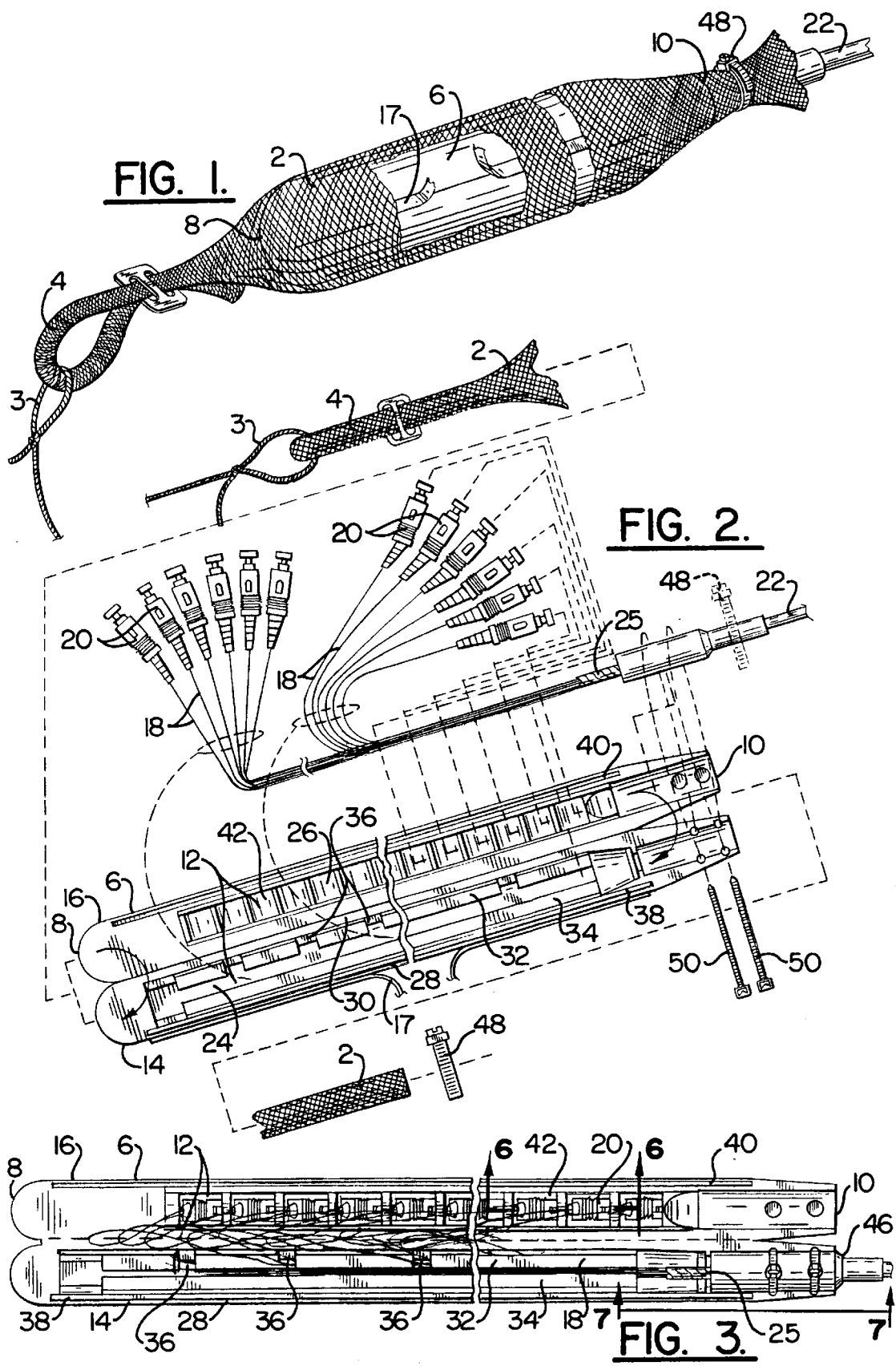

PULLING GRIP FOR PRE-CONNECTORIZED FIBER OPTIC CABLE

FIELD OF THE INVENTION

The present invention relates generally to a pulling grip for use in installing a fiber optic cable and, more particularly, a pulling grip for use in installing a fiber optic cable having a plurality of pre-connectorized optical fibers.

BACKGROUND OF THE INVENTION

Optical fibers are widely used in a variety of data transmission applications including, primarily at the present, the telecommunications industry. Because optical fibers transmit voice and other data far more rapidly and efficiently Lhan copper wire, the demand for optical fibers is continuing to increase. For example, optical fibers no longer serve merely as the medium for long distance signal transmission, but are increasingly routed directly to the home or, in some instances, directly to a desk or other work location to network computers.

In order to route and install fiber optic cable in builings or other structures, the fiber optic cable must generally be routed or pulled through a protective conduit or duct having a diameter of as little as 2 inches. Generally, a pulling grip consisting essentially of a tubular mesh with a loop at one end, such as disclosed in U.S. Pat. No. 4,368,910, is attached to the lead end of the fiber optic cable. A rope is then attached to the pulling grip for pulling the cable through the conduit.

Fiber optic cable of various diameters and wall thicknesses is now being manufactured to meet the requirements of various applications. Many fiber optic cables include one or more buffer tubes, each of which can carry a plurality of optical fibers. The optical fibers may be in a loose bundle or a ribbon form. Fiber optic cables also generally include a protective jacket which surrounds the buffer tube(s) in order to further protect the optical fibers. For added convenience, pre-connectorized fiber optic cable is also available. With pre-connectorized fiber optic cables, each of the optical fibers include a respective factory-installed connector which has been mounted on an end portion of the optical fiber prior to installation of the fiber optic cable. By mounting the connectors in the factory, the time required in the field to install and connect the fiber optic cable is reduced. In addition, the quality of the resulting connection may be enhanced by mounting the connectors in the factory since the factory conditions can be more readily controlled than the field conditions.

Presently, installing pre-connectorized fiber optic cable is fairly difficult due to the mass of connectors mounted on the ends of the optical fibers at the lead end of the fiber optic cable. For installation, the cable jacket and strength members are generally cut back a certain distance from the pre-connectorized end portions of the optical fibers. As a result, a leg length is defined for each optical fiber as the distance between the end of the cable jacket and the respective connector. The mass of connectors at the end of the optical fibers has required that the leg lengths of the fibers be staggered so that the connectors can fit within the relatively small diameter conduit or duct through which the fiber optic cable is routed. Depending upon the particular installation requirements, these staggered leg lengths may be undesirable. For example, the layout of a particular installation may require that the leg lengths be uniform in length. Additionally, other installations may require the leg lengths to vary significantly which also makes installation of the fiber optic cable difficult using present techniques and tools.

U.S. Pat. No. 5,133,583 discloses an advantageous method for using a contractile mesh pulling grip to pull a fiber optic cable through a conduit. According to this method, a portion of the cable jacket is removed to expose an end portion of the strength members which may thereafter be attached to the pulling grip. The mesh type pulling grip of U.S. Pat. No. 5,133,583 is not, however, suitable for installing pre-connectorized fiber optic cables because it does not provide suitable protection for the connectors or the optical fibers which must be protected from excessive bending during installation.

Therefore, while pulling grips and methods are presently available for installing pre-connectorized fiber optic cable, these present pulling grips and methods do not allow the installation of pre-connectorized optic fibers with uniform leg lengths or significantly varying leg lengths. Furthermore, present pulling grips do not fully protect the optical fibers or their connectorized end portions from the mechanical stress and strain to which they are subjected during installation.

SUMMARY OF THE INVENTION

It is therefore an object of the present invention to facilitate the installation of fiber optic cables and preferably pre-connectorized fiber optic cables by providing a pulling grip housing to enclose the connectorized ends of the optical fibers.

It is therefore another object of the present invention to facilitate the installation of pre-connectorized fiber optic cables having uniform leg lengths by providing a pulling grip housing to enclose the connectorized ends of the optical fibers.

It is yet a further object of the present invention to provide a tool for minimizing damage to pre-connectorized fiber optic cable during installation.

These and other objects are provided, according to the present invention, by a pulling grip and a related cable assembly for use in installing fiber optic cable and, more particularly, for installing a fiber optic cable which contains a plurality of pre-connectorized optical fibers. The pulling grip includes an elongated, flexible pulling grip housing extending between a first end and a second end and defining an internal cavity. The pulling grip housing includes first and second portions which mate to form the pulling grip housing and which open to provide access to the internal cavity for placement of the plurality of the pre-connectorized optical fibers of the fiber optic cable in a predetermined positional relationship. The housing may be made of any flexible material such as rubber or plastic and is preferably made of polyurethane.

According to one advantageous embodiment, the pulling grip housing further defines a longitudinal axis which extends through the first and second ends. The first and second portions of the pulling grip housing preferably define first and second internal compartments, respectively, which cooperate to form the internal cavity. The first portion of the pulling grip housing further includes first and second opposed sides which define a portion of the first internal compartment and which extend parallel to the longitudinal axis of the pulling grip housing. Retaining edges extend inwardly from the first and second sides into the first internal compartment defined by the first portion of the pulling grip housing in order to retain the optical fibers therein. According to another advantageous embodiment, at least one internal compartment of the pulling grip contains a plurality of slots adapted to temporarily retain respective ones of the connectors during the installation of the fiber optic cable.

For example, the plurality of slots may be disposed in a longitudinally extending row such that the pre-connectorized optical fibers are looped within the internal cavity defined by the pulling grip housing.

In yet another preferred embodiment, at least one of the retaining edges further includes at least one cut-out or notch to facilitate the routing of the optical fibers from the first internal compartment to the second internal compartment. The first portion also preferably includes a lengthwise extending tongue portion. The second portion of this embodiment preferably defines a lengthwise extending groove for cooperably receiving the tongue portion to thereby facilitate closure of the first and second portions. The pulling grip housing may further include a connecting member for hingedly connecting the first and second portions together.

In a preferred embodiment, the first and second portions cooperate to define a channel for receiving a cable collar. The cable collar includes a cylindrical member having a stepped outer diameter and defining a bore through which the fiber optic cable extends. By securing the fiber optic cable within the cable collar and by retaining the cable collar within the channel defined by he first and second portions of the pulling grip housing, the fiber optic cable can be securely connected to the pulling grip.

According to another advantageous embodiment, the pulling grip housing includes an adhesive surface within the internal cavity for temporarily retaining the pre-connectorized optical fibers. In yet another embodiment, the pulling grip can include a deformable member having a plurality of recesses adapted to receive and temporarily retain respective connectors of the pre-connectorized optical fibers.

In another advantageous embodiment of the pulling grip housing, the pulling grip housing is at least partially divided in a direction transverse to the longitudinal axis. The pulling grip housing of this embodiment is therefore divided into the first and second portions which include the first and second ends, respectively. The pulling grip housing of this advantageous embodiment may include an elongated, flexible tray adapted to retain the pre-connectorized optical fibers and capable of being inserted into and removed from the internal cavity defined by the pulling grip housing. The elongated tray may further include a plurality of slots for temporarily retaining the connectors on the optical fibers. Alternatively, the tray may include an adhesive surface for temporarily retaining the pre-connectorized optical fibers.

Therefore, a pulling grip housing of the present invention facilitates the installation of a fiber optic cable having a plurality of pre-connectorized optical fibers. The internal cavity defined by the pulling grip housing is adapted to receive a plurality of pre-connectorized optical fibers which may have respective leg lengths which are either uniform or different. As a result, the pulling grip housing protects the optical fibers and the respective connectors from damage during installation while permitting pre-connectorized fiber optic cables to be installed regardless of the leg lengths of the optical fibers. dr

BRIEF DESCRIPTION OF THE DRAWINGS

FIG. 1 is a perspective view of the pulling grip housing of one embodiment of the present invention inside of a pulling grip mesh.

FIG. 2 is an exploded view showing the placement of a pre-connectorized fiber optic cable into the pulling grip housing of one embodiment of the present invention and, in turn, into a pulling grip mesh.

FIG. 3 is a top view of the pulling grip housing shown in FIG. 2 with a pre-connectorized fiber optic cable in place.

DETAILED DESCRIPTION OF THE PREFERRED EMBODIMENT

Figure 4:
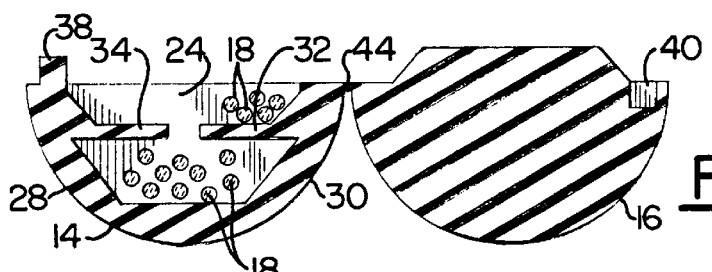
FIG. 4 is a cross-sectional view of the embodiment of the pulling grip housing of FIG. 3 taken along line 4—4 and illustrating the first and section portions of the housing.

The present invention will now be described more fully hereinbelow with reference to the accompanying drawings, in which a preferred embodiment of the invention is shown. This invention may, however, be embodied in many different forms and should not be construed as limited to the embodiments set forth herein; rather this embodiment is provided so that this disclosure will be thorough and complete and will fully convey the scope of the invention to those skilled in the art. Like numbers refer to like elements throughout.

Referring now to FIG. 1, a cable assembly according to one embodiment of the present invention is illustrated which includes a fiber optic cable 22, a pulling grip housing 6 mounted on one end of the cable, and a pulling grip mesh 2 enveloping the pulling grip housing. Once the pulling grip housing has received and grasped the end portion of a fiber optic cable as described below, the pulling grip housing is placed inside the pulling grip mesh. The pulling grip mesh is secured around the first end 10 of the pulling grip housing and/or the end portion of the cable 22, such as with a clamp 48. The unclamped end of the pulling grip mesh typically includes a loop 4 which allows attachment of a rope 3 for pulling the pulling grip housing through small conduit or duct.

The pulling grip housing 6 is preferably made of polyurethane foam and is tubular shaped to optimize the internal compartment for holding the pre-connectorized optical fibers. The housing can be made of other rubber or flexible materials, however, without departing from the spirit and scope of the present invention. In addition, while the pulling grip housing 6 is preferably tubular in shape so as to define a generally circular cross-sectional shape, the pulling grip housing may be formed in other shapes as long as the pulling grip housing fits into the particular conduit or duct. In the case of a tubular shaped housing, the diameter of the housing is less than the inside diameter of the predetermined size of conduit or duct through which it will be pulled. For example, the diameter of the housing may be as little as one inch.

As shown more fully in FIG. 2, the pulling grip housing 6 includes a first end 8 and a second end 10. The ends are preferably rounded or tapered to facilitate travel through the conduit. The pulling grip housing also includes a first portion 14 and a second portion 16 which mate to form the pulling grip housing and which open to provide access to an internal cavity 12 for placement of the plurality of pre-connectorized optical fibers 18.

Figure 5:
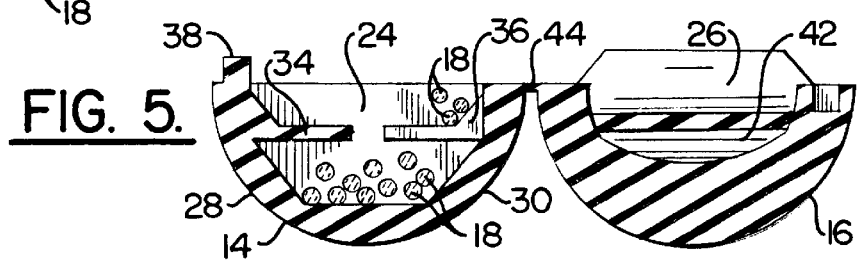
FIG. 5 is a cross-sectional view of the embodiment of the pulling grip housing of FIG. 3 taken along line 5—5 and illustrating the first and second portions of the housing.

As illustrated in FIGS. 4 and 5, the first and second portions 14, 16 are hingedly connected by a connecting member 44 to further facilitate closure of the pulling grip housing 6. The connecting member may be formed by incomplete cutting of the housing into two portions or any other means which hingedly connects the first and second portions together. As further illustrated in FIGS. 2, 3, 4, 5 and 8, the first portion 14 of one embodiment of the pulling grip housing 6 includes a lengthwise extending tongue 38 which cooperates with a lengthwise extending groove 40 defined by the second portion 16. The tongue and groove cooperate to facilitate closure of the first and second portions once the pre-connectorized optical fibers have been loaded into the internal cavity 12.

As illustrated in FIGS. 2, 3 and 5, the first portion 14 and second portion 16 preferably include a first internal compartment 24 and a second internal compartment 26, respectively, which cooperate to form the internal cavity 12. The first portion has a first side 28 and a second side 30 which define at least a portion of the internal compartment 24 of the first portion. The first and second sides extend generally parallel to the longitudinal axis of the pulling grip housing. In a preferred embodiment shown in FIGS. 2, and 3, the first portion also includes a first retaining edge 32 and a second retaining edge 34 that extend inwardly from the first side 28 and the second side 30, respectively, and into the internal compartment 24 of the first portion 14 in order to retain the optical fibers 18 in the first portion.

FIGS. 4 and 5 further illustrate the first and second internal compartments 24, 26 of the pulling grip housing 6. The retaining edges 32, 34 extend inwardly into the first internal compartment and are preferably disposed about midway down the first and second sides 28, 30 of the first portion. The retaining edges, however, can be disposed at other positions relative to the first and second sides so long as sufficient space is allowed below the retaining edges for retaining the optical fibers 18. Preferably, a gap is defined between the retaining edges through which the optical fibers may be inserted.

Referring to one advantageous embodiment of the pulling grip housing 6 shown in FIGS. 2 and 3, one of the retaining edges 32 which extends inwardly into the first compartment 24 contains at least one cut-out or notch 36 and, more preferably, a plurality of cut-outs or notches. As shown, the notches assist in routing the optical fibers 18 from the first compartment into the second compartment 26 in a controlled fashion which limits or prevents tangling of the optical fibers.

Figure 8:
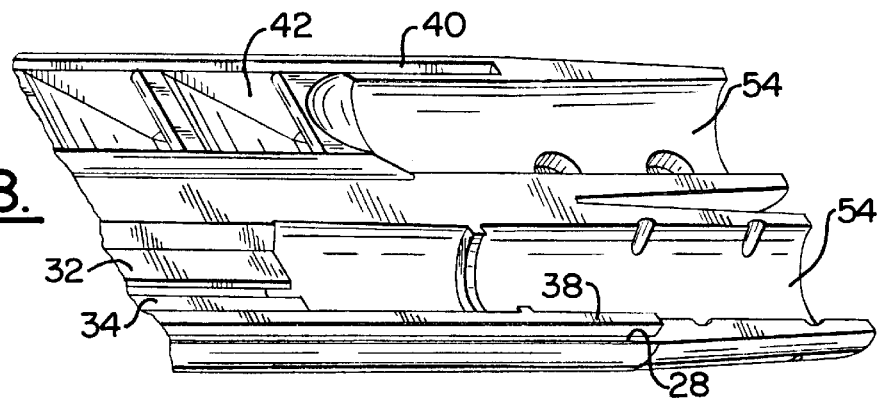
FIG. 8 is a fragmentary perspective view of one end of the embodiment of the pulling grip housing of FIG. 3 which illustrates the channel for receiving the cable collar.

The pulling grip housing 6 also preferably includes means for at least temporarily retaining the connectors in a predetermined positional relationship during the installation of the fiber optic cable 22 such that the connectors and, in turn, the respective optical fibers are not unnecessarily tangled. As illustrated in FIG. 2, the second compartment of one advantageous embodiment includes at least one slot 42 and, more preferably, a plurality of slots adapted to temporarily retain the connectors 20 which are mounted on end portions of the optical fibers. In this regard, FIG. 8 provides an enlarged perspective view of the second end 10 of the pulling grip housing 6 which further illustrates the first and second compartments 24, 26 of the first and second portions 14, 16, respectively. As shown in FIG. 8, the slots 42 defined by the second portion are angled downwardly to maximize the space available for the insertion of connectors without excessively bending the optical fibers. In other words, the slots are preferably angled to minimize bending of the optical fibers and to increase the number of connectors which may be accommodated in a housing of a given length and diameter. Although rectangular slots are illustrated, the slots defined by the second portion can have various shapes in order to receive and temporarily retain the various types of optical fiber connectors.

Figure 6:
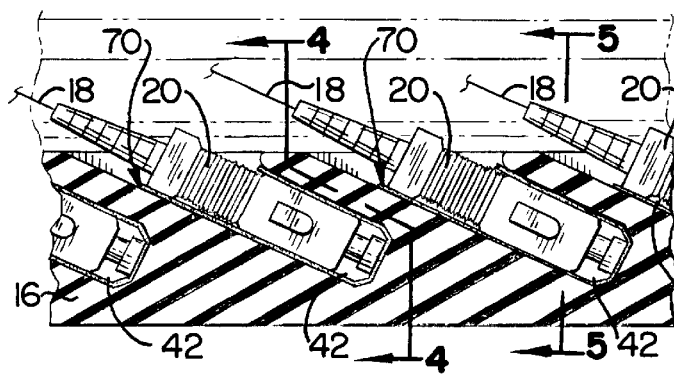
FIG. 6 is a cross-sectional view of the embodiment of the pulling grip housing of FIG. 3 taken along line 6—6 and illustrating the retention of the connectors within respective slots in the second portion of the housing.

FIG. 6 is a cross-sectional view of the second portion 16 of the pulling grip housing 6 which further illustrates the second internal compartment 26. As described above, the second portion preferably includes a plurality of slots 42 for temporarily retaining the connectors 20 disposed on the ends of the optical fibers 18. As shown in FIG. 6 and, in more detail, in FIG. 3, the second portion of one advantageous embodiment includes a plurality of slots arranged in a longitudinally extending row. As a result, the pulling grip can accommodate a plurality of pre-connectorized optical fibers having equal leg lengths within the relatively slender, elongate pulling grip housing since the arrangement of the slots and the design of the pulling grip housing effectively manage the optical fibers by permitting the pre-connectorized optical fibers to extend longitudinally through at least a portion of the internal cavity prior to looping back to the respective slot.

Although a pulling grip housing 6 which includes slots 42 for temporarily retaining the connectors 20 is illustrated and described hereinabove, the second portion 16 need not include slots, but can include other means of retaining the connectors as described above, without departing from the spirit and scope of the present invention. For example, the second internal compartment 26 may include an adhesive surface to temporarily secure the connectors within the housing. In yet another embodiment, the internal cavity 12 may include a deformable member defining a plurality of recesses adapted to receive and temporarily retain respective ones of the connectors.

FIG. 2 illustrates the placement of the connectorized optical fibers 18 in the pulling grip housing 6 which is, in turn, inserted into the pulling grip mesh 2. As shown, a cable collar 46 has been placed over an end portion of the fiber optic cable 22 and has been secured to a strength element 25 of the fiber optic cable 22. The cable collar 46 of one advantageous embodiment includes a cylindrical member having a stepped outer diameter which defines a lengthwise extending bore through which the cable 22 extends. The bore is filled with an epoxy or other adhesive to secure the collar to the cable and, more preferably, to the strength element 25 of the cable.

Figure 7:
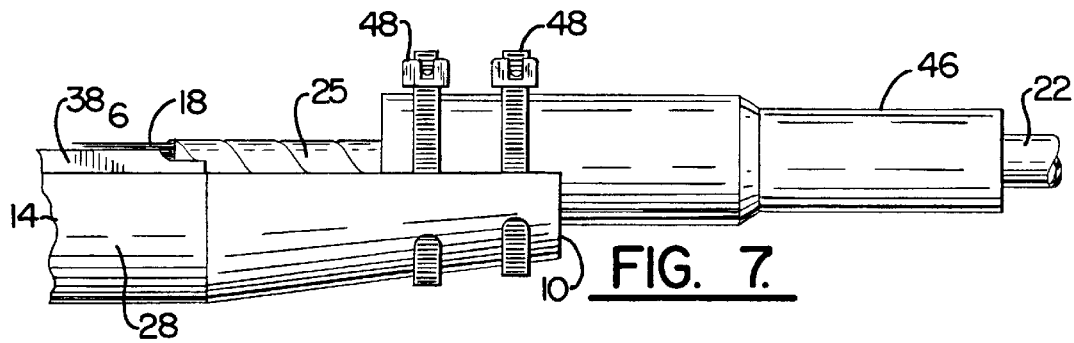
FIG. 7 is a fragmentary side view of one end of the embodiment of the pulling grip housing of FIG. 3 which illustrates the attachment of the cable collar to one end of the housing.

The first and second portions of the pulling grip housing 6 also define a channel 54 for receiving the cable collar 46 as illustrated in FIG. 7. The cable collar can then be further secured within the second end 10 of the pulling grip housing by one or more ties 50. As a result, the forces imparted by pulling the pulling grip through a conduit will be transferred to the strength element 25 of the fiber optic cable 22 and will not place undesirable strain on the individual optical fibers 18 of the fiber optic cable.

Once the cable collar 46 is mounted to the fiber optic cable 22 and is secured within the second end 10 of the pulling grip housing 6, the pulling grip housing can be closed around the cable collar. As shown in FIG. 1, the pulling grip mesh 2 can be placed over the pulling grip housing 6 and is secured around the cable collar 46, such as with a clamp 48. A rope 3 is then tied to the loop 4 of the pulling grip mesh such that the fiber optic cable 22 can be pulled or advanced through the conduit or duct. Once installed, the pulling grip mesh and the pulling grip housing can be removed and the pre-connectorized optical fibers 18 can be accessed for subsequent connection.

Figure 9:
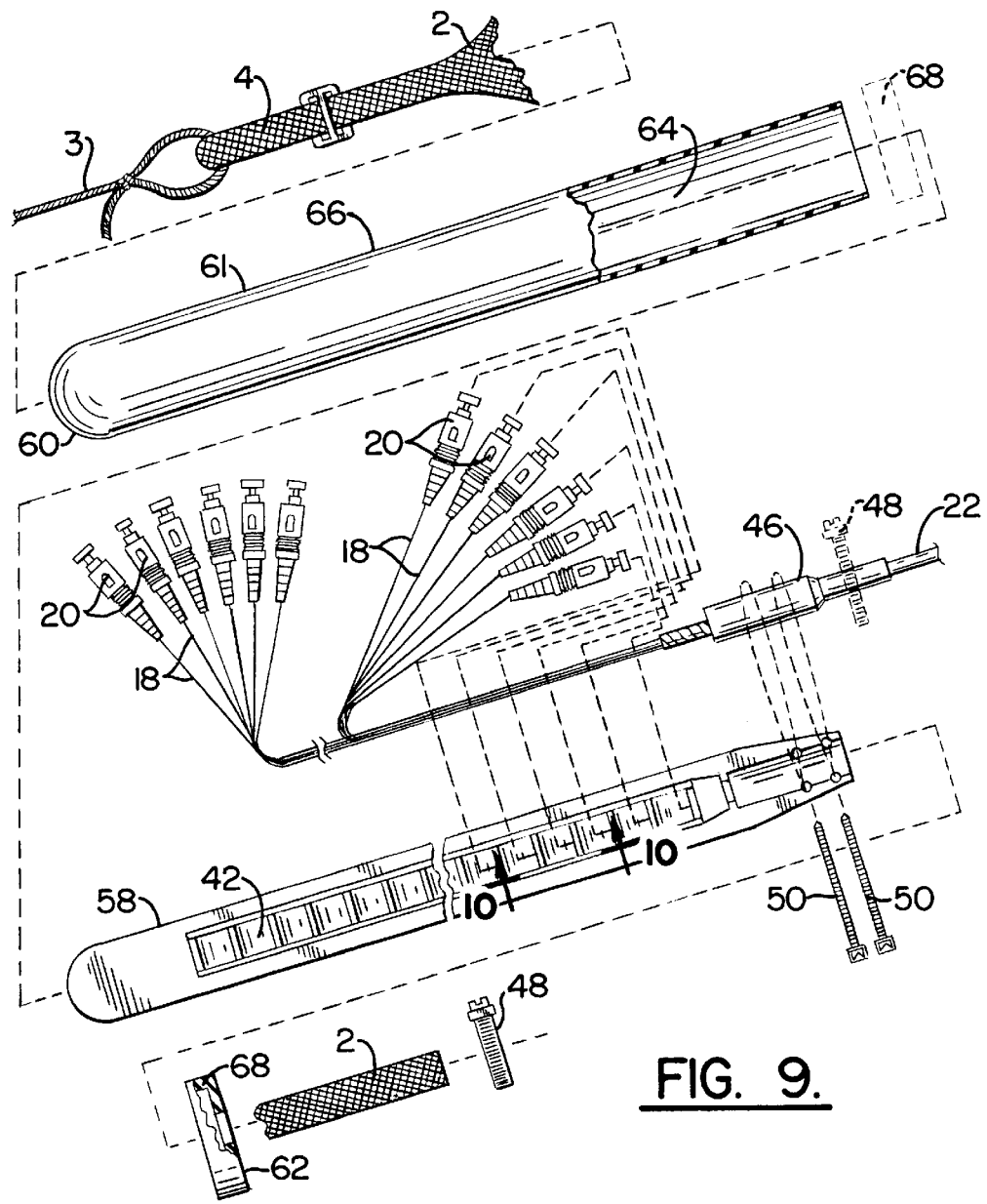
FIG. 9 is an exploded view of another advantageous embodiment of the pulling grip housing of the present invention which includes a cable tray adapted to be inserted into one end of the pulling grip housing.

FIG. 9 illustrates yet another preferred embodiment of the pulling grip housing 61. The pulling grip housing includes first and second portions 66, 68 which are at least partially divided in a direction transverse to the longitudinal axis of the pulling grip housing. As a result, the first portion of this embodiment of the pulling grip housing includes the first end 60 of the pulling grip housing and the second portion of this embodiment of the pulling grip housing includes the second end 62 of the pulling grip housing. While the first and second portions of the embodiment of the pulling grip housing illustrated in FIG. 9 are of greatly different sizes with the second portion serving mainly as a cap, the first and second portions can be of similar sizes without departing from the spirit and scope of the present invention.

Figure 10:
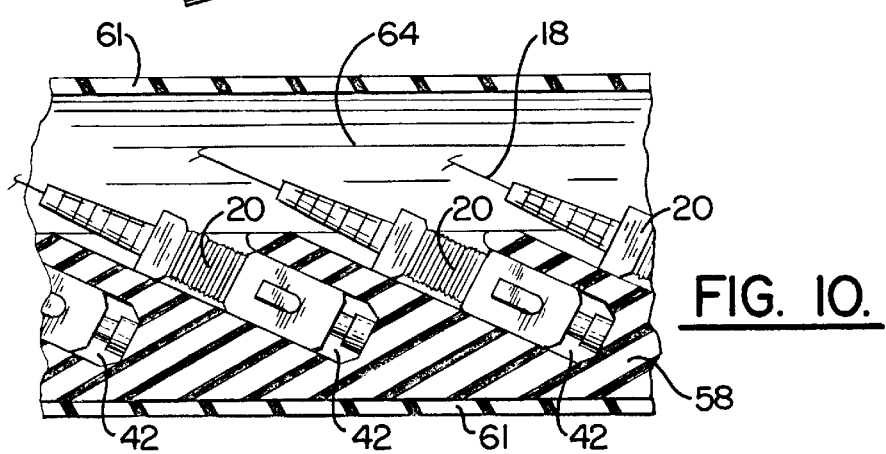
FIG. 10 is a cross-sectional view of one portion of the embodiment of the cable tray of FIG. 9 taken along line 10—10 following the insertion of the connectors within respective slots in the second portion of the housing.

The pulling grip housing 61 of this embodiment includes an elongated tray 58 adapted to retain the pre-connectorized optical fibers 18 and capable of being inserted into and removed from an internal cavity 64 defined by the first portion 66 of the housing. As shown in FIG. 10, the tray preferably defines a plurality of slots 42 for receiving respective ones of the fiber optic connectors 20. As shown, the slots defined by the tray of this embodiment are preferably similar to the slots defined by the second portion of the embodiment of the pulling grip housing shown in FIGS. 2 and 3. Alternatively, the tray may be relatively flat and may include an adhesive 70 surface or other means of temporarily holding the pre-connectorized optical fibers in place such that the connectors and the optical fibers are not unnecessarily tangled.

As described above, the pulling grip of the various embodiments of the present invention provides a tool to facilitate the installation of fiber optic cable 22 having a plurality of pre-connectorized optical fibers. In particular, the internal cavity 12 defined by the pulling grip housing 6 is adapted to receive a plurality of pre-connectorized optical fibers which may have respective leg lengths which are either uniform or different. In addition, the pulling grip housing can include various means for retaining the connectors and the end portions of the optical fibers such that the connectors and the optical fibers are not unnecessarily tangled during the installation of the fiber optic cable. As a result, the pulling grip housing protects the optical fibers and the respective connectors 20 from damage during installation while permitting pre-connectorized fiber optic cables to be installed regardless of the leg lengths of the optical fibers.

In the drawings and specification there has been set forth preferred embodiments of the invention and, although specific terms are employed, the terms are used in a generic and descriptive sense only and not for the purpose of limiting the scope of the invention being set forth in the following claims.

That which is claimed is:

1. A cable assembly for installing a fiber optic cable comprising:

a fiber optic cable having a plurality of pre-connectorized optical fibers extending from a first end thereof, wherein at least two of said pre-connectorized optical fibers are of equal length;

a pulling grip operably connected to the first end of said fiber optic cable, wherein said pulling grip comprises an elongated, flexible pulling grip housing defining an internal cavity, and wherein said pulling grip housing comprises first and second portions which mate to form the pulling grip housing and which open to provide access to said internal cavity for receiving said plurality of pre-connectorized optical fibers including said pre-connectorized optical fibers of equal length;

said first and second portions define first and second internal compartments, respectively, which cooperate to form the internal cavity;

the first portion of the pulling grip housing comprises first and second opposed sides which define a portion of the first internal compartment;

first and second retaining edges extend inwardly from the first and second sides, respectively, into the first internal compartment for retaining the optical fibers therein;

at least one of said first and second retaining edges comprises at least one notch to facilitate the routing of optical fibers from said first internal compartment to said second internal compartment.

2. A cable assembly according to claim 1 further comprising a plurality of connectors mounted on respective end portions of said plurality of optical fibers prior to installation of said fiber optic cable, wherein at least one internal compartment defines a plurality of slots for temporarily retaining respective ones of said connectors while installing said fiber optic cable.

3. A cable assembly according to claim 2 wherein the plurality of slots defined by the internal compartment of said pulling grip housing are disposed in a longitudinally extending row such that said pre-connectorized optical fibers are looped within the internal cavity defined by said pulling grip housing while installing said fiber optic cable.

4. A cable assembly according to claim 1 wherein said pulling grip housing further comprises a connecting member for hingedly connecting said first and second portions.

5. A pulling grip for use in installing a fiber optic cable which contains a plurality of pre-connectorized optical fibers including at least two pre-connectorized optical fibers of equal length, said pulling grip comprising:

an elongated, flexible pulling grip housing extending between a first end and a second end and defining an internal cavity, wherein said pulling grip housing comprises first and second portions which mate to form the pulling grip housing and which open to provide access to said internal cavity for placement of the plurality of pre-connectorized optical fibers including at least two pre-connectorized optical fibers of equal length in a predetermined positional relationship;

said first and second portions define first and second internal compartments, respectively, which cooperate to form the internal cavity;

at least one internal compartment defines a plurality of slots for temporarily retaining respective ones of the connectors while installing the fiber optic cable; and wherein the Plurality of slots defined by the internal compartment are disposed in a longitudinally extending row such that the pre-connectorized optical fibers are looped within the internal cavity defined by said pulling grip housing while installing the fiber optic cable.

6. A pulling grip according to claim 5 wherein the first portion of the pulling grip housing comprises:

first and second opposed sides which define a portion of the first internal compartment and which extend parallel to said longitudinal axis of said pulling grip housing; and first and second retaining edges extending inwardly from the first and second sides, respectively, into the first internal compartment defined by the first portion of said pulling grip housing in order to retain the optical fibers therein.

7. A pulling grip according to claim 6 wherein at least one of the first or second edges further comprises at least one notch to facilitate the routing of optical fibers from said first internal compartment to said second internal compartment.

8. A pulling grip according to claim 5 wherein the first portion further comprises a lengthwise extending tongue portion, and wherein the second portion defines a lengthwise extending groove for cooperably receiving said tongue portion to thereby facilitate closure of said first and second portions.

9. A pulling grip according to claim 5 further comprising a connecting member for hingedly connecting said first and second portions.

10. A pulling grip according to claim 5 wherein the first and second portions cooperate to define a channel for receiving a cable collar, wherein the cable collar comprises a cylindrical member having a stepped outer diameter and defining a bore through which the fiber optic cable extends such that the fiber optic cable can be connected to the pulling grip.

11. A pulling grip according to claim 5, wherein said pulling grip housing is made of a flexible material selected from the group consisting of rubber or plastic.

12. A pulling grip according to claim 5 further comprising an adhesive surface within the internal cavity for temporarily retaining the pre-connectorized optical fibers while installing the fiber optic cable.

13. A pulling grip according to claim 5 further comprising a deformable member disposed in said internal cavity, said deformable member defining a plurality of recesses adapted to receive and temporarily retain respective connectors of the pre-connectorized optical fibers.

14. A pulling grip according to claim 5 wherein said pulling grip housing defines a longitudinal axis extending through the first and second ends, and wherein said pulling grip housing is at least partially divided in a direction transverse to the longitudinal axis into the first and second portions which include the first and second ends, respectively.

15. A pulling grip according to claim 14 further comprising an elongated tray adapted to retain the pre-connectorized optical fibers and capable of being inserted into and removed from the internal cavity.

16. A pulling grip according to claim 15 wherein the tray further comprises a plurality of slots for temporarily retaining respective ones of the pre-connectorized optical fibers.

17. A pulling grip according to claim 15 wherein the tray further comprises an adhesive surface for temporarily retaining the pre-connectorized optical fibers while installing the fiber optic cable.

18. A pulling grip for use in installing a fiber optic cable having at least two pre-connectorized optical fibers, said pulling grip comprising:

a pulling grip housing having an internal cavity and first and second portions;

said first and second portions mate to form the pulling grip housing, and are movable for providing access to said internal cavity, said first and second portions define first and second internal compartments, respectively, which cooperate to form said internal cavity for receiving looped optical fibers;

at least one of said internal compartments includes connector receiving areas for retaining respective ones of the connectors, at least some of said connector receiving areas are disposed such that the pre-connectorized optical fibers extend from said fiber optic cable and are looped within the pulling grip housing as the optical fibers are routed to said connector receiving areas.

19. The pulling grip of claim 18, wherein at least two of said pre-connectorized optical fibers are of substantially equal length.

20. The pulling grip of claim 18, wherein said pulling grip housing defines a longitudinal axis extending through the first and second ends, and wherein said pulling grip housing is at least partially divided in a direction transverse to the longitudinal axis into the first and second portions which include the first and second ends, respectively.

21. The pulling grip of claim 18, wherein said pulling grip further comprises an elongated tray adapted to retain the pre-connectorized optical fibers, said tray is insertable into and removeable from the internal cavity.

22. The pulling grip of claim 21, wherein said connector receiving areas are part of said tray, said connector receiving areas comprising a plurality of slots.

23. The pulling grip of claim 21, wherein the tray further comprises an adhesive surface for temporarily retaining the pre-connectorized optical fibers while installing the fiber optic cable.

24. A pulling grip for use in installing a fiber optic cable having at least one pre-connectorized optical fiber, said pulling grip comprising:

a pulling grip housing having an internal cavity and first and second portions, and a leading end for leading said pulling grip along a direction of pull;

said first and second portions mate to form the pulling grip housing, and are movable for providing access to said internal cavity, said first and second portions define first and second internal compartments, respectively, which cooperate to form said internal cavity; and at least one of said internal compartments includes a connector receiving area for retaining a connector attached to the pre-connectorized optical fiber, said connector receiving area is disposed such that a mating face of said connector is directed generally away from said direction of pull.

25. The pulling grip of claim 21, wherein said connector receiving area includes a web-like member for retaining said connector.

26. A pulling grip for use in installing a fiber optic cable having at least two pre-connectorized optical fibers, said pulling grip comprising:

a pulling grip housing having an internal cavity and first and second portions;

said first and second portions mate to form the pulling grip housing, and are movable for providing access to said internal cavity, said first and second portions define first and second internal compartments, respectively, which cooperate to form said internal cavity;

at least one of said internal compartments includes connector receiving areas for receiving respective connectors along respective connector insertion directions, at least some of said connector receiving areas include connector insertion stops, said connector insertion stops are generally transverse to a respective connector insertion direction for controlling insertion of the connectors.

27. The pulling grip of claim 26, wherein at least one of said connector insertion stops comprises an abutment surface for abutting a respective connector.

28. The pulling grip of claim 26, wherein said connector receiving areas are disposed at an angle relative to a longitudinal axis of said pulling grip.

29. The pulling grip of claim 26, wherein said at least two pre-connectorized optical fibers are of generally equal length.

30. A pulling grip for use in installing a fiber optic cable having at least two pre-connectorized optical fibers, said pulling grip comprising:

a pulling grip housing having an internal compartment with retaining members for retaining said pre-connectorized optical fibers in place, at least one of said retaining members includes an optical fiber passage for the disposition of at least one of said pre-connectorized optical fibers therethrough as said at least one pre-connectorized optical fiber is looped and routed to a respective said connector receiving area, said retaining members are operative to retain said optical fibers so that said optical fibers may extend from said fiber optic cable generally toward a leading end of said pulling grip for being looped and then extending generally toward said fiber optic cable.

31. The pulling grip of claim 30, wherein said retaining members comprise a gap therebetween for insertion of the pre-connectorized optical fibers.

32. The pulling grip of claim 30, wherein said pre-connectorized optical fibers are disposed on both sides of said retaining members as said pre-connectorized optical fibers are looped to respective said connector receiving areas.

33. The pulling grip of claim 30, wherein said at least one optical fiber passage comprises a notch formed in said at least one retaining member.

34. A pulling grip for use in installing a fiber optic cable having at least two pre-connectorized optical fibers, said pulling grip comprising:

a pulling grip housing having an internal cavity and first and second portions;

said first and second portions mate to form the pulling grip housing, and are movable for providing access to said internal cavity, said first and second portions define first and second internal compartments, respectively, which cooperate to form said internal cavity;

at least one of said internal compartments includes connector receiving areas for receiving respective connectors along respective connector insertion directions, at least some of said connector receiving areas include a respective adhesive portion, said adhesive portions are operative to contact and adhere to respective said connectors for retaining said connectors in place.

* * * * *